(12) United States Patent
Maruyama et al.

(10) Patent No.: US 7,980,844 B2
(45) Date of Patent: Jul. 19, 2011

(54) INJECTION MOLDING MACHINE AND METHOD FOR DETERMINING CLOSURE OF CHECK RING

(75) Inventors: Junpei Maruyama, Yamanashi (JP); Satoshi Takatsugi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 282 days.

(21) Appl. No.: 12/117,839

(22) Filed: May 9, 2008

(65) Prior Publication Data

US 2008/0305199 A1    Dec. 11, 2008

(30) Foreign Application Priority Data

Jun. 6, 2007 (JP) ................... 2007-150644

(51) Int. Cl.
*B28B 17/00* (2006.01)
*A23P 1/00* (2006.01)
(52) U.S. Cl. ......... 425/149; 425/145; 425/557; 425/589
(58) Field of Classification Search .................. 425/149, 425/145, 559, 587
See application file for complete search history.

(56) References Cited

U.S. PATENT DOCUMENTS

| 5,153,149 | A | 10/1992 | Naito et al. |
| 5,425,906 | A * | 6/1995 | Hashimoto ................. 264/40.1 |
| 7,074,028 | B2 | 7/2006 | Watanabe et al. |
| 7,661,946 | B2 * | 2/2010 | Maruyama et al. ........... 425/145 |
| 2002/0026264 | A1 * | 2/2002 | Choi ............................ 700/197 |
| 2003/0062643 | A1 * | 4/2003 | Bulgrin et al. ............... 264/40.1 |
| 2004/0142056 | A1 | 7/2004 | Watanabe et al. |

FOREIGN PATENT DOCUMENTS

| EP | 0349649 A1 | 10/1990 |
| EP | 1439047 A1 | 7/2004 |
| GB | 1567791 | 5/1980 |
| JP | 03-114721 A | 5/1991 |
| JP | 04-053720 A | 2/1992 |
| JP | 04-201225 A | 7/1992 |
| JP | 2004-216808 A | 8/2004 |

OTHER PUBLICATIONS

EP Search Report for 08103947.1 dated Oct. 13, 2008.

* cited by examiner

*Primary Examiner* — Yogendra N Gupta
*Assistant Examiner* — Jeremiah Smith
(74) *Attorney, Agent, or Firm* — Lowe Hauptman Ham & Berner LLP (57) ABSTRACT

Torques and resin pressures applied to a screw are detected during the forward movement of the screw and coefficients of correlation between the detected torques and resin pressures are calculated. When the check ring is open, the flight of the screw receives resin pressure, and the screw torque increases proportionally to the resin pressure due to resin backflow, so the coefficients of correlation between the screw torques and the resin pressures are higher than a reference value. When the check ring closes, the flight of the screw no longer receive resin pressure, so the screw torque decreases and the coefficients of correlation become lower than the reference value. The check ring is determined to be closed when the coefficients of correlation become lower than the reference value.

8 Claims, 6 Drawing Sheets

COEFFICIENT OF CORRELATION > REFERENCE VALUE

| SAMPLING CYCLE i | RESIN PRESSURE P | TORQUE Q | SCREW POSITION L | COEFFICIENT OF CORRELATION R |
|---|---|---|---|---|
| 0 | P0 | Q0 | L0 | R0 (CORRELATION OF n+1 PIECES OF DATA OF SAMPLING CYCLES 0 TO n) |
| 1 | P1 | Q1 | L1 | R1 (CORRELATION OF n+2 PIECES OF DATA OF SAMPLING CYCLES 0 TO n+1) |
| 2 | P2 | Q2 | L2 | R2 (CORRELATION OF n+3 PIECES OF DATA OF SAMPLING CYCLES 0 TO n+2) |
| ⋮ | ⋮ | ⋮ | ⋮ | ⋮ |
| n | Pn | Qn | Ln | Rn (CORRELATION OF 2n+1 PIECES OF DATA OF SAMPLING CYCLES 0 TO n+n) |
| n+1 | Pn+1 | Qn+1 | Ln+1 | Rn+1 (CORRELATION OF 2n+1 PIECES OF DATA OF SAMPLING CYCLES 1 TO 2n+1) |
| ⋮ | ⋮ | ⋮ | ⋮ | ⋮ |
| i | Pi | Qi | Li | Ri (CORRELATION OF 2n+1 PIECES OF DATA OF SAMPLING CYCLES i-n TO i+n) |
| ⋮ | ⋮ | ⋮ | ⋮ | ⋮ |
| N-n | PN-n | QN-n | LN-n | RN-n (CORRELATION OF 2n+1 PIECES OF DATA OF SAMPLING CYCLES N-2n TO N) |
| ⋮ | ⋮ | ⋮ | ⋮ | ⋮ |
| N | PN | QN | LN | Rn (CORRELATION OF n+1 PIECES OF DATA OF SAMPLING CYCLES N-n TO N) |

INJECTION MOLDING MACHINE AND METHOD FOR DETERMINING CLOSURE OF CHECK RING

RELATED APPLICATIONS

The present application is based on, and claims priority from, Japanese Application Number 2007-150644, filed Jun. 6, 2007, the disclosure of which is hereby incorporated by reference herein in its entirety.

BACKGROUND OF THE INVENTION

1. Field of the Invention

The present invention generally relates to an injection molding machine having a check ring disposed at the front end of a screw, and more particularly to a technique for detecting the point at which the check ring closes.

2. Description of the Related Art

In an injection molding machine having a check ring disposed at the front end of the screw, the check ring is open when the metering of resin is completed. When injection starts with the check ring being open, the resin pressure in front of the check ring is raised as the screw moves forward, so the check ring is forced to move backward and closes the flow path of the resin. The time at which the check ring closes varies with the resin pressures in front of and behind the check ring at the time when injection starts. Since resin backflow occurs from the front to the back of the check ring after injection starts and continues until the check ring closes, variations in closure timing of the check ring cause the volume of injected resin to vary and accordingly affect the quality of molded articles.

To address such variations in closure timing of the check ring, a known technique attempts to stabilize the closure timings of the check ring in every molding cycle.

Another known technique for addressing the variations in closure timing of the check ring monitors the time at which the check ring actually closes. For example, a known method detects the time point at which the check ring closes by detecting a change in resin pressure during the forward movement of the screw by means of a pressure sensor disposed within the cylinder behind the check ring (upstream of resin flow) (See Japanese Patent Applications Laid-Open No. 4-53720 and No. 4-201 225, which will be hereinafter referred to as Patent Documents 1 and 2, respectively). In another known invention, resin pressures are detected by a pressure sensor disposed within the cylinder behind the check ring and the detected resin pressures are integrated and compared with a reference value. If the integrated value exceeds the reference value, an alarm is issued so that the molded article is checked for defective molding (See Japanese Patent Application Laid-Open No. 3-114721, which will be hereinafter referred to as Patent Document 3).

Another known method detects the time point at which the check ring closes by detecting the stop of rotation of the screw being rotated during injection by the torque caused by the pressure applied to the screw flights by the resin backflow occurring during forward movement of the screw (See Japanese Patent Application Laid-Open No. 2004-216808, which will be hereinafter referred to as Patent Document 4).

The inventions described in Patent Documents 1 and 2 detect the time point at which the check ring closes by detecting a change in the resin pressures detected by the pressure sensor. The check ring is open when injection starts, so the resin pressure is continuously raised as the screw moves forward. When the check ring closes during injection, the resin pressure stops being raised and starts to be reduced. This change in resin pressure enables the time point at which the check ring closes to be detected. These inventions have drawbacks, however, because they cannot detect the time point at which the check ring closes if the resin pressure does not change because the check ring is already closed when injection starts or the check ring does not close during injection.

The invention described in Patent Document 3, which detects the time point at which the check ring closes from the integrated value of detected resin pressures, can determine whether the check ring operates normally as the check ring has been closed at the start of injection or the check ring operates normally as the check ring is closed in the midst of injection process or the check ring does not operate normally as the check ring has not been closed during an injection/hold pressure process.

In each of the inventions described in Patent Documents 1 to 3, a resin pressure sensor has to be disposed in the cylinder so as to detect the resin pressure within the cylinder and behind the check ring. Further, it is necessary for the resin pressure sensor to be disposed at a point in the rear of the position of the check ring when the screw has moved backward fully. Accordingly, parts such as resin pressure sensor and amplifier have to be additionally provided. Since the resin pressure sensor is disposed at a point in the rear of the position of the check ring when the screw has moved backward fully, the position of the check ring is, if a metering stroke is small, apart from the position where the resin pressure sensor is disposed. In such a case, it is possible that the resin pressure detected by the resin pressure sensor does not match the resin pressure immediately behind the check ring, so the state of the check ring can not always be detected with accuracy.

Unlike the inventions described in Patent Documents 1 to 3, the invention described in Patent Document 4 does not require the resin pressure sensor to be disposed within the cylinder behind the check ring, but this invention cannot detect an exact time point at which the check ring closes, because the screw receives a torque due to a pressure of the resin backflow leaking through a slight gap between the check ring and the inner wall of the cylinder even if the check ring is closed. Furthermore, the flights receive a torque due to the movement of the resin accumulated in the grooves between flights of the screw during the forward movement of the screw. The screw torque varies with the viscosity and pressure (injection pressure) of the resin and may cause the screw to rotate even when the check ring is closed.

SUMMARY OF THE INVENTION

An object of the present invention is to provide an injection molding machine that enables the closure of a check ring to be determined with accuracy without any additional special parts, regardless of the distance of metering stroke. Another object of the present invention is to provide a method for determining the time point at which the check ring closes.

An injection molding machine according to the present invention includes a screw equipped with a check ring, axial driving means for driving the screw in its axial direction, rotational driving means for rotating the screw, torque detecting means for detecting the torque applied to the screw, and resin pressure detecting means for detecting the resin pressure. The injection molding machine further includes correlation coefficient calculating means for calculating coefficients of correlation between the torques detected by the torque detecting means and the resin pressures detected by the resin pressure detecting means during the forward movement of the screw, and check ring closure determining means for determining the time point at which the check ring closes when the coefficients of correlation obtained during the forward movement of the screw become lower than a reference value.

The injection molding machine can further include screw position detecting means for detecting the positions of the screw in its axial direction, and storage means for storing the screw position detected by the screw position detecting means when the check ring closure determining means determines the time point at which the check ring closes.

The injection molding machine can further include storage means for obtaining and storing the elapsed time from the start of forward movement of the screw until the check ring closure determining means determines the time point at which the check ring closes.

The injection molding machine can further include signal output means for issuing a signal indicating that the check ring did not close during the forward movement of the screw when the check ring closure determining means determines that the coefficients of correlation exceed the reference value throughout the forward movement of the screw.

In this description, the forward movement of the screw refers to either the forward movement of the screw in an injection/hold pressure process or the forward movement of the screw performed between the end of a metering process and the start of an injection process.

The torque detecting means may detect the torque from a driving force of the rotational driving means or may detect a strain of the screw due to the torque acting on the screw.

The method for determining the closure of the check ring in the injection molding machine according to the present invention is applicable to any injection molding machine having a screw equipped with a check ring, axial driving means for driving the screw in its screw axial direction, rotational driving means for rotating the screw, torque detecting means for detecting the torque acting on the screw, and resin pressure detecting means for detecting the resin pressure. The method for determining the closure of the check ring includes the steps of calculating coefficients of correlation between the torques detected by the torque detecting means and the injection pressures detected by the injection pressure detecting means during the forward movement of the screw, displaying a waveform corresponding to the calculated coefficients of correlation in a display device, and determining the closure of the check ring when the displayed coefficients of correlation become lower than the reference value during the forward movement of the screw.

The present invention enables the time point at which the check ring closes to be detected without any additional special parts, regardless of the distance of metering stroke, by discriminating the cases in which the check ring is already closed when the screw starts moving forward, the check ring closes during the forward movement of the screw, and the check ring does not close during the forward movement of the screw.

BRIEF DESCRIPTION OF THE DRAWINGS

The above and other objects and features of the present invention will become apparent from the following description of embodiments with reference to the accompanying drawings, in which.

DETAILED DESCRIPTION OF THE PREFERRED EMBODIMENTS

Figure 1:
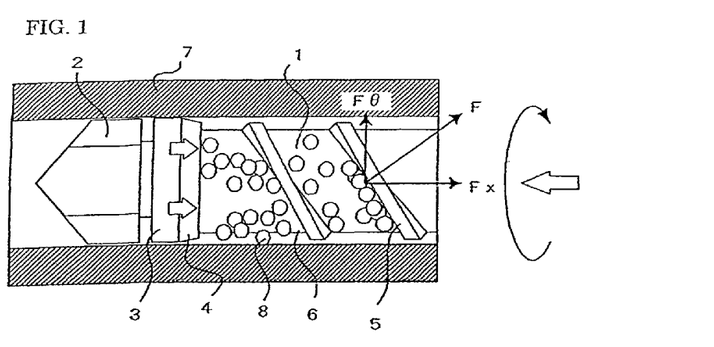
FIG. 1 illustrates an example of a check ring mechanism that is conventionally used.

First, the principle used in determining the time point at which the check ring closes in the present invention will be described. FIG. 1 shows an example of a check ring mechanism that is conventionally used. A screw 1 is inserted within a cylinder 7. The screw 1 has a screw head 2 at its front end and a portion of reduced diameter between the screw head 2 and the body of the screw 1. A check ring 3 is disposed on the portion of reduced diameter and is movable in the axial direction of the screw. A check seat 4 is also disposed on the portion of reduced diameter toward the body of the screw 1 so as to be brought into tight contact with the check ring 3 to close the resin path.

As the screw 1 rotates in a metering process, resin pellets 8 are supplied from the rear end of the screw 1 and melted by both the shearing heat generated by rotation of the screw 1 and the heat from a heater disposed outside the cylinder 7 in which the screw 1 is inserted. The molten resin raises the resin pressure behind the check ring 3, producing a force pressing the check ring 3 forward. When the check ring 3 is pressed forward, the resin behind the check ring 3 flows through a gap between the check ring 3 and the portion of reduced diameter into the space in front of the check ring 3, raising the pressure within the cylinder 7 in front of the screw head 2.

When the resin pressure in front of the check ring 3 exceeds a predetermined pressure (the back pressure), the screw 1 is pressed backward and the pressure in front of the check ring 3 is reduced. As the screw 1 continues to rotate, the pressure behind the check ring 3 becomes higher than the pressure in front of the check ring 3, so the molten resin is continuously fed forward into the space in front of check ring 3. When the screw 1 has retreated a predetermined distance (to the metering position), the rotation of the screw 1 is stopped.

Next, the injection process starts. The screw 1 moves forward (in the axial direction of the screw, i.e., from right to left in FIG. 1) to inject the resin into the mold. The resin pressure in front of the screw head 2 is thereby raised, so the check ring 3 is pressed backward and brought into tight contact with the check seat 4, closing the resin path and thus preventing backflow of the molten resin in the direction opposite to the advance of the screw.

If resin backflow occurs during the forward movement of the screw 1, the flight 5 of the screw 1 is pressed backward by a force corresponding to the resin pressure (injection pressure) of the resin backflow. This force F is composed of a force Fx acting in the axial direction of the screw (pressing the screw backward) and a force F$\theta$ acting in the screw rotation direction (turning the screw in the direction opposite to the direction during metering process). Thus, the backflow applies a screw torque F$\theta$ (hereinafter referred to as pressure-dependent screw torque) corresponding to the injection pressure to the screw 1 until the check ring 3 closes. The pressure-dependent screw torque F$\theta$ is raised with the injection pressure being raised until the check ring closes, and is reduced, independently of the pressure being raised, after the check ring closes.

But, if the resin pressure (injection pressure) starts to be reduced during the forward movement of the screw, the screw torque F$\theta$ starts to decrease before the check ring closes. It is difficult, therefore, to accurately determine the time point at which the check ring closes simply from the increase/decrease of the screw torque F$\theta$.

In view of this, according to the present invention, coefficients of correlation between screw torques and resin pressures (injection pressures) are calculated to determine the time point at which the check ring closes depending on the magnitudes of the coefficients of correlation. When the coefficients of correlation are equal to or greater than a reference value, the check ring is determined to be open; when the coefficients of correlation are lower than the reference value, the check ring is determined to be closed.

FIGS. 2A-4B illustrate screw torques and resin pressures in an injection/hold pressure process, and coefficients of correlation between the screw torques and the resin pressures and a reference value for determining the time point at which the check ring closes.

Figure 2A:
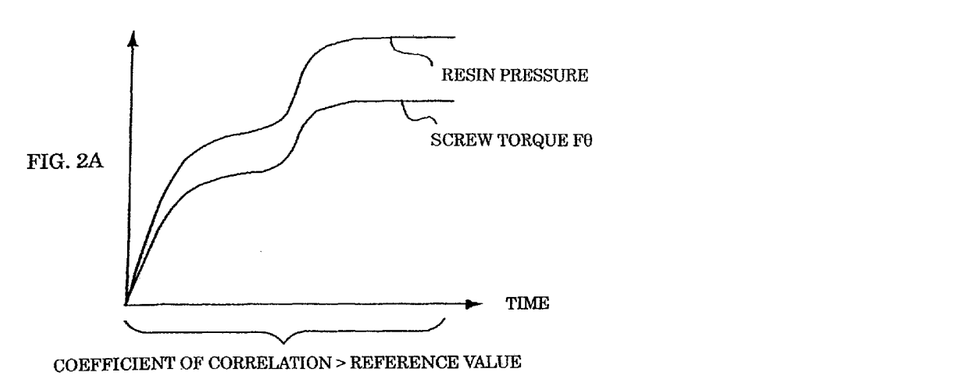
FIG. 2A illustrates screw torques and resin pressures when the check ring does not close in an injection/hold pressure process.
Figure 2B:
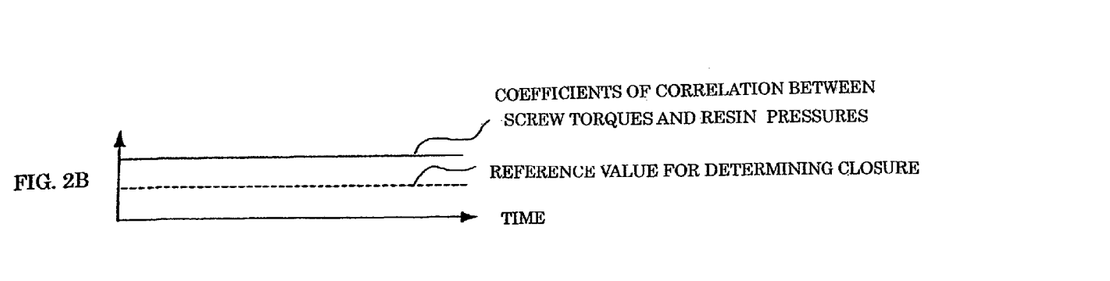
FIG. 2B shows coefficients of correlation between the screw torques and the resin pressures and a reference value for determining the time point at which the check ring closes when the check ring does not close in an injection/hold pressure process.

FIGS. 2A and 2B illustrate the case in which the coefficients of correlation between screw torques and resin pressures are higher than the reference value throughout the injection to hold pressure processes, indicating that the check ring did not close. As shown in FIG. 2A, as the screw moves forward and the resin pressure is raised in front of the screw, the screw torque F$\theta$ also increases. Consequently, as shown in FIG. 2B, the coefficients of correlation between screw torques and resin pressures, which will be described below, exceed the reference value throughout the injection to hold pressure processes, so it is detected that the check ring did not close.

Figure 3A:
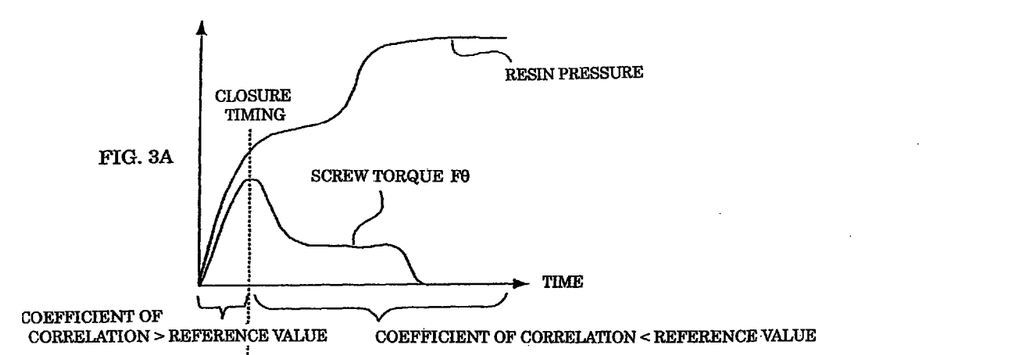
FIG. 3A illustrates screw torques and resin pressures when the check ring closes during the forward movement of the screw in an injection/hold pressure process.
Figure 3B:
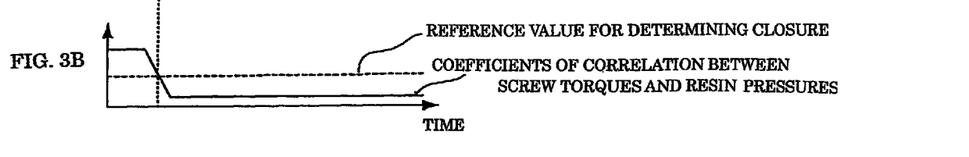
FIG. 3B shows coefficients of correlation between the screw torques and the resin pressures and a reference value for determining the time point at which the check ring closes when the check ring closes during the forward movement of the screw in an injection/hold pressure process.

FIGS. 3A and 3B illustrate the case in which the check ring closes during the forward movement of the screw in the injection/hold pressure process. As shown in FIG. 3A, as the screw moves forward, the resin pressure in front of the screw is raised. When the check ring closes during the forward movement of the screw, the screw torque F$\theta$ starts to decrease inversely with the resin pressure being raised. Consequently, the coefficients of correlation between screw torques and resin pressures become lower than the reference value as shown in FIG. 3B, enabling the time point at which the check ring closes to be detected.

Figure 4A:
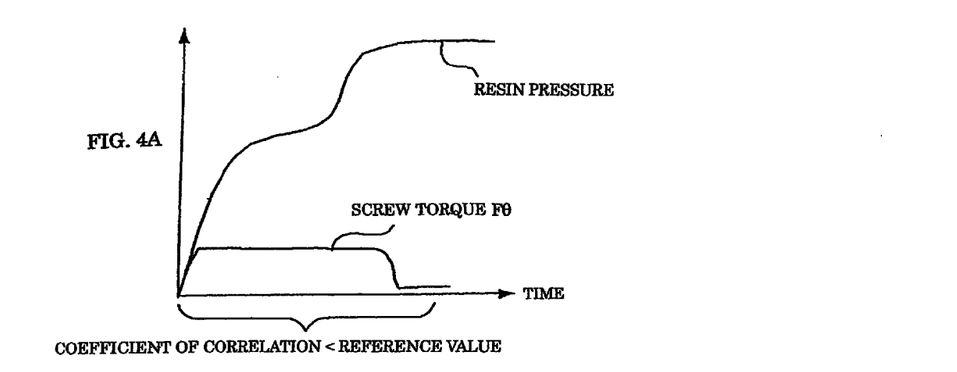
FIG. 4A illustrates screw torques and resin pressures when the check ring is already closed when injection starts in an injection/hold pressure process.
Figure 4B:
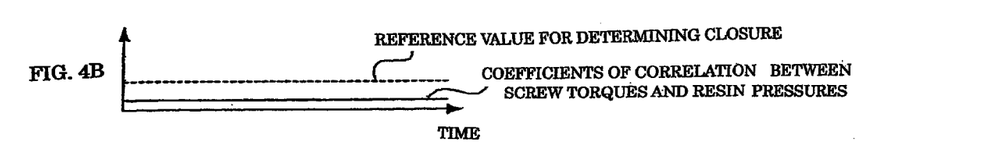
FIG. 4B shows coefficients of correlation between the screw torques and the resin pressures and a reference value for determining the time point at which the check ring closes when the check ring is already closed when injection starts in an injection/hold pressure process.

If the check ring is already closed when injection starts, the screw torque does not increase and thus the coefficient of correlation does not increase as the screw moves forward and the resin pressure is raised as shown in FIG. 4A. Accordingly, the coefficients of correlation between screw torques and resin pressures are lower than the reference value throughout the injection to hold pressure processes as shown in FIG. 4B, so it is determined that the check ring is already closed when injection starts.

Figure 5:
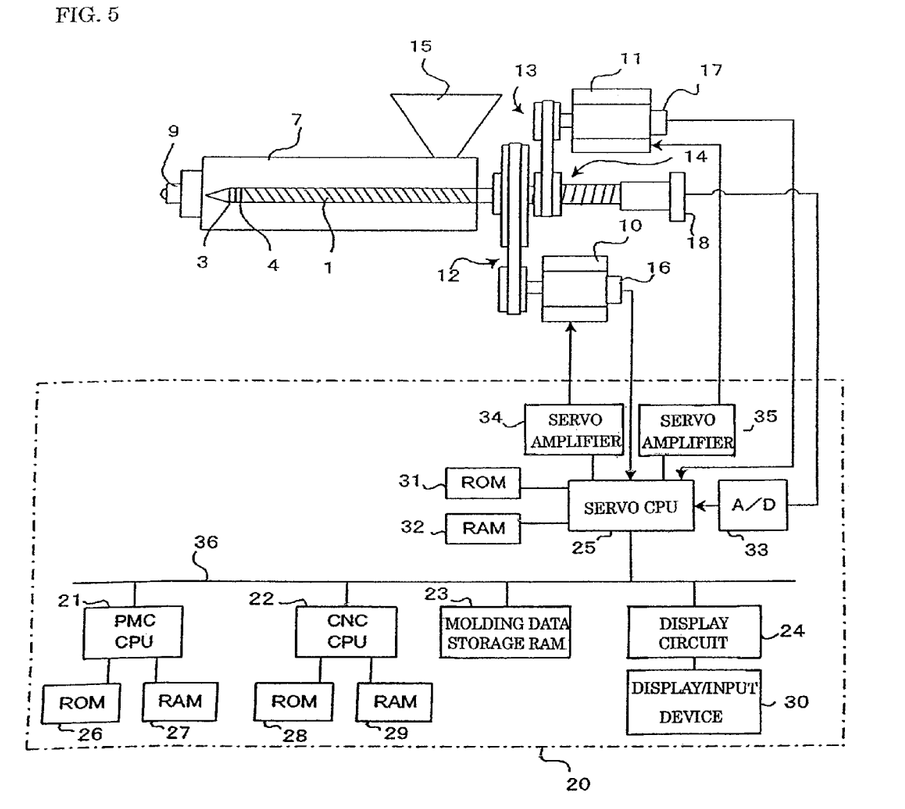
FIG. 5 is a block diagram showing the main sections of an injection molding machine according to an embodiment of the present invention.

FIG. 5 is a block diagram showing the main sections of an injection molding machine in which the method for determining the time point at which the check ring closes according to the present invention is performed.

A nozzle 9 is provided at the front end of the cylinder 7 in which a screw 1 is inserted and a hopper 15 through which resin pellets are supplied into the cylinder 7 is provided near the rear end of the cylinder 7. The screw 1 has near its front end a check ring mechanism including a check ring 3 and a check seat 4. The screw 1 is rotated when driven by a screw rotating servo motor 10 acting as a rotational driving means, through a transmission mechanism 12 including a belt and pulleys.

The screw 1 is also axially driven to control injection and back pressure by an injection servo motor 11 acting as a driving means for axially driving the screw 1, through a transmission mechanism 13 and a conversion mechanism 14 such as a ball screw and nut that converts rotational motion into rectilinear motion. The screw rotating servo motor 10 and injection servo motor 11 are equipped with position/speed detecting devices 16, 17, respectively, for detecting their positions and rotational speeds, so that the rotational speed, position in the axial direction, and velocity (injection speed) of the screw 1 can be detected. Furthermore, a pressure sensor 18 such as a load cell is provided to detect the resin pressure, i.e., the pressure applied by the molten resin to the screw 1 in its axial direction.

A control unit 20 for controlling this injection molding machine is connected through a bus 36 to a CNC CPU 22, which is a microprocessor for numerical control, a PMC CPU 21, which is a microprocessor for a programmable machine controller (PMC), and a servo CPU 25, which is a microprocessor for servo control.

The PMC CPU 21 is connected to a ROM 26 where programs such as a sequence program for controlling the operation sequence of the injection molding machine are stored, and a RAM 27 for temporarily storing arithmetic data. The CNC CPU 22 is connected to a ROM 28 where programs such as an automatic operation program for controlling the injection molding machine as a whole are stored, and a RAM 29 for temporarily storing arithmetic data.

The servo CPU 25 is connected to a ROM 31 in which a control program dedicated to servo control for position, speed, and electric current loop processing is stored, and a RAM 32 for temporarily storing data. The servo CPU 25 is also connected to a servo amplifier 34 for driving the screw rotating servo motor 10, and to a servo amplifier 35 for driving the injection servo motor 11 that drives the screw 1 axially for injection and other operations, according to commands from the CPU 25.

The screw rotating servo motor 10 and injection servo motor 11 are equipped with position/speed detecting devices 16, 17 respectively, the outputs from which are fed back to the servo CPU 25. The servo CPU 25 controls the drive of the servo motors 10, 11 through the servo amplifiers 34, 35 by performing position/speed feedback control according to motion commands to the respective axes (to the screw rotating servo motor 10 and injection servo motor 11) from the CNC CPU 22 and the position and speed information fed back from the position/speed detecting devices 16, 17, and also by performing electric current feedback control. A current position register is provided so that the position (in the axial direction) of the screw 1 moving forward can be obtained from the position feedback signal from the position/speed detecting device 17.

The resin pressure (applied to the screw) detected by the pressure sensor 18 is converted to a digital signal by an A/D converter 33 and input to the servo CPU 25. To detect the torque that is produced by resin backflow and causes the screw 1 to rotate, a well-known disturbance estimating observer is incorporated into the drive control processing performed by the screw rotating servo motor 10, and the disturbance estimating observer detects the torque applied to the screw 1 in its rotational direction.

Servo motors and servo amplifiers for driving a mold clamping mechanism and an ejector mechanism are also provided in the injection molding machine shown in FIG. 5, but they are not directly related to the present invention, so they are omitted in FIG. 5.

An input device 30 with a liquid crystal or CRT display is connected through a display circuit 24 to the bus 36. A molding data storage RAM 23 made of a nonvolatile memory is also connected to the bus 36. The RAM 23 stores data related to injection molding, such as molding conditions, various settings, parameters, and macro variables.

In the above configuration, well-known digital servo processing takes place. More specifically, the PMC CPU 21 controls the operation sequence of the injection molding machine as a whole; the CNC CPU 22 distributes motion commands to the servo motors of respective axes according to the operation programs in the ROM 28 and molding conditions and other data stored in the molding data storage RAM 23; and the servo CPU 25 performs conventional servo control such as position loop control, speed loop control, and current loop control according to the motion commands distributed to the axes (the axis driving servo motors, including the screw rotating servo motor 10 and injection servo motor 11) and the position, speed, and other feedback signals detected by the position/speed detecting devices.

The above configuration is not different from that of the control unit in conventional electrically-powered injection molding machines, except for an additional function for determining the time point at which the check ring closes by calculating coefficients of correlation between screw torques and resin pressures during forward movement of the screw.

Figure 6:
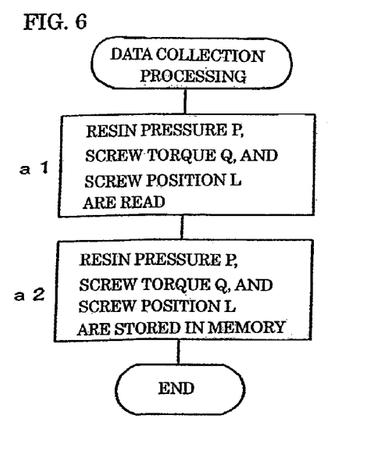
FIG. 6 is a flowchart illustrating an algorithm used in the data collection process performed every predetermined sampling intervals in the injection/hold pressure process for collecting data, including resin pressures, screw torques, and screw positions, to determine the time point at which the check ring closes in an embodiment of the present invention.
Figure 7:
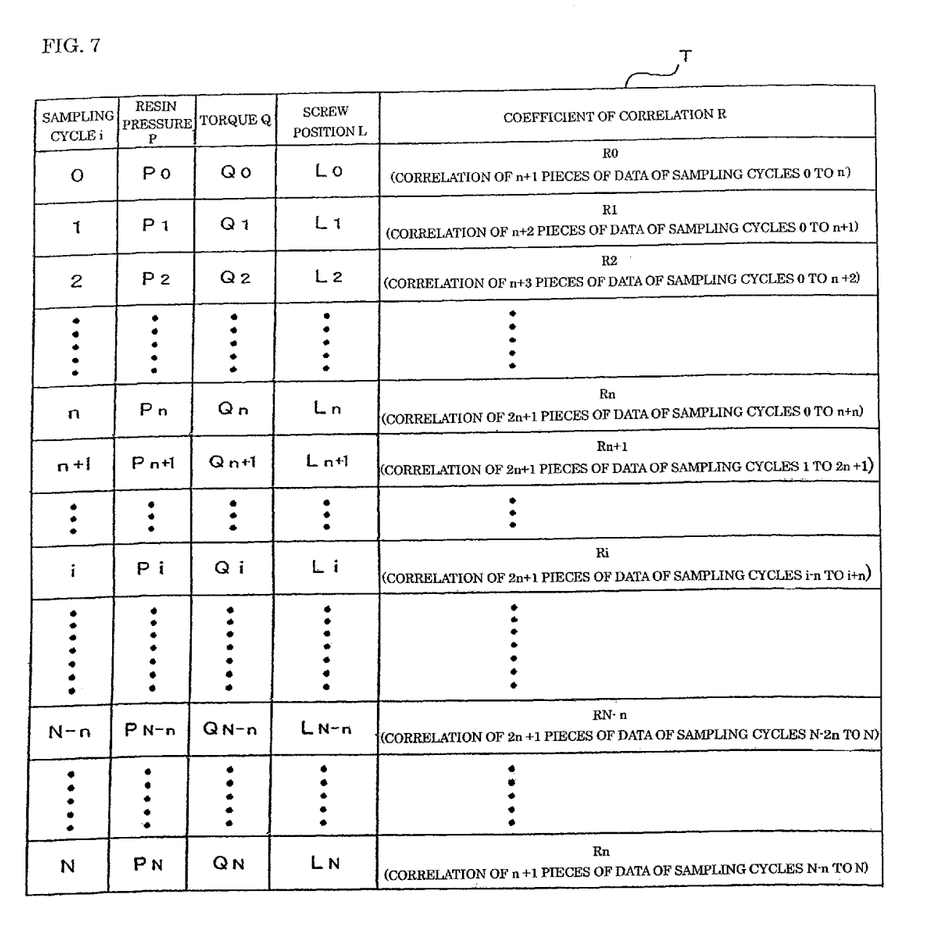
FIG. 7 illustrates a table for storing data collected every predetermined sampling intervals to determine the closure of a check ring in an embodiment of the present invention.
Figure 8:
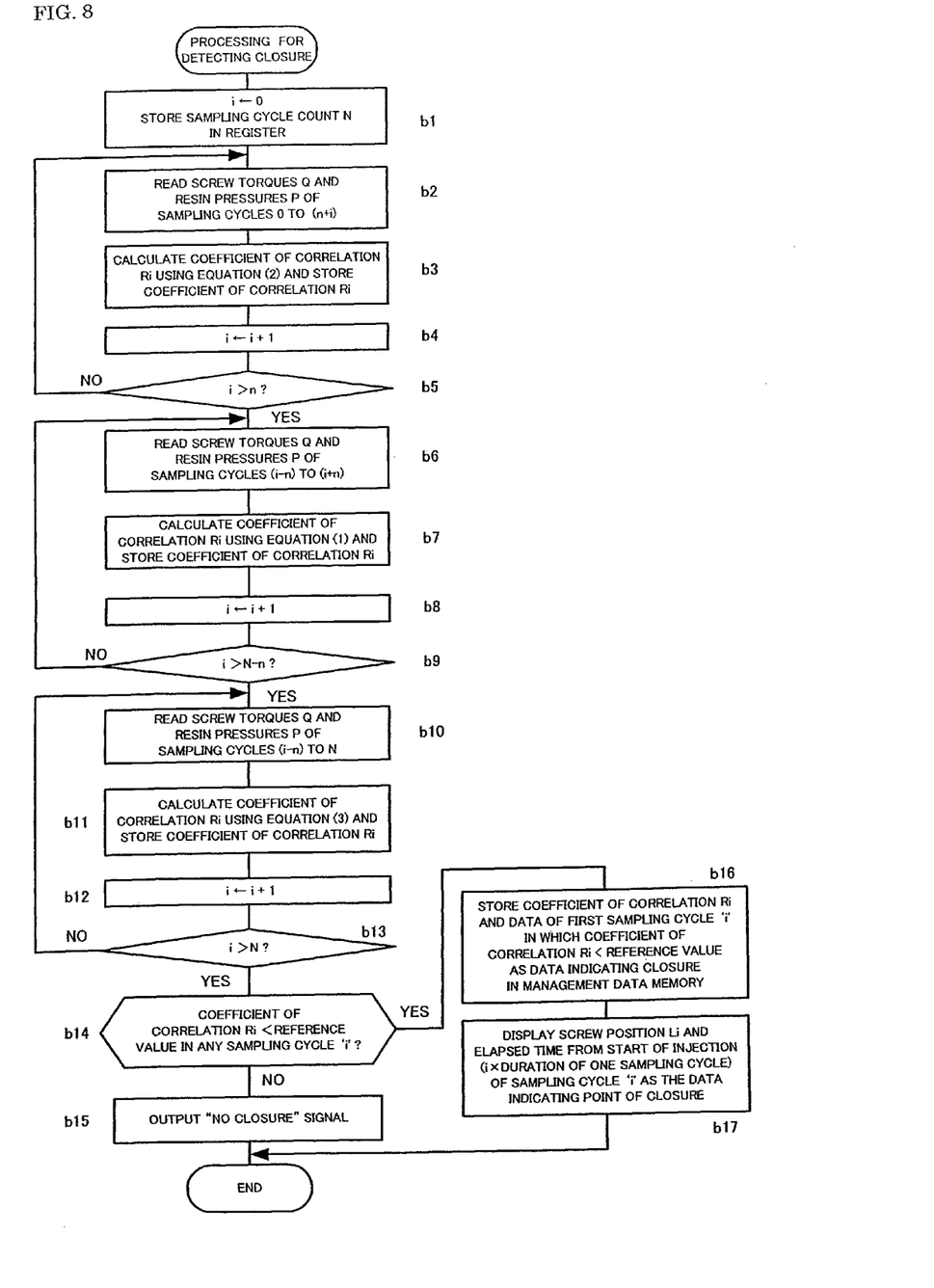
FIG. 8 is a flowchart showing an algorithm used to determine the time point at which the check ring closes in a first embodiment of the method for determining the time point at which the check ring closes according to the present invention.

FIG. 6 is a flowchart illustrating a data collection algorithm executed by the control unit 20 at a predetermined sampling intervals in the injection/hold pressure process to collect data including resin pressures (injection pressures) P, screw torques Q, and screw positions L to detect the time point at which the check ring closes. FIG. 7 illustrates the table T provided in a memory (RAM 29) to chronologically store the data collected at each sampling cycle. FIG. 8 is a flowchart illustrating an algorithm for determining the time point at which the check ring closes by calculating coefficients of correlation on the basis of the collected data in a first embodiment of the present invention.

When injection starts and the screw 1 moves forward, the CNC CPU 22 executes the data collecting processing shown in FIG. 6 at a predetermined sampling intervals. First, the CNC CPU 22 reads, via the servo CPU 25, the resin pressure (injection pressure) P detected by the pressure sensor 18 and input via an A/D converter 33. It also reads the torque Q applied to the screw and obtained by the disturbance estimating observer incorporated in the processing performed by the servo CPU 25. The CNC CPU 22 also obtains the screw position (position of the screw moving forward) L indicated by a value in the current position register that stores the position of the injection servo motor 11 by integrating signals fed back from the position/speed detecting device 17 (Step a1).

Next, the obtained resin pressure (injection pressure) P, screw torque Q, and screw position L are stored as chronological data corresponding to an index 'i' indicating the current sampling cycle in the table T provided in the RAM 29 as shown in FIG. 7 (Step a2). This processing is repeated at a predetermined sampling intervals from the start of injection to the end of pressure holding, to collect data required to determine the time point at which the check ring closes.

Once the injection/hold pressure process ends and data is chronologically stored in the table T, the CNC CPU 22 starts processing for determining the time point at which the check ring closes. FIG. 8 is a flowchart illustrating the processing for determining the time point at which the check ring closes in this embodiment.

In the first embodiment, as well as in the second embodiment described below, the coefficient of correlation R between screw torques Q and resin pressures P is calculated from the data collected in (2n+1) sampling cycles in total including the current sampling cycle, 'n' sampling cycles preceding the current sampling cycle, and 'n' sampling cycles following the current sampling cycle. Here, the number 'n' of sampling cycles for calculating the coefficient of correlation R is predetermined and preset. The coefficient of correlation Ri for sampling cycle 'i' is expressed by the following equation (1):

$$Ri = \frac{\frac{1}{2n+1}\sum_{j=i-n}^{i+n}(Pj-\overline{P})(Qj-\overline{Q})}{\sqrt{\frac{1}{2n+1}\sum_{j=i-n}^{i+n}(Pj-\overline{P})^2} \times \sqrt{\frac{1}{2n+1}\sum_{j=i-n}^{i+n}(Qj-\overline{Q})^2}} \quad (1)$$

Until the number of sampling cycles reaches the preset value 'n' from the start of injection, there is not 'n' sampling cycles preceding the current sampling cycle. In this case, the coefficient of correlation Ri is calculated by the following equation (2) using the data of the first sampling cycle (i=0) up to the data of the sampling cycle (n+i), the sampling cycle following the current sampling cycle 'i' by 'n' sampling cycles.

$$Ri = \frac{\frac{1}{n+i+1}\sum_{j=0}^{i+n}(Pj-\overline{P})(Qj-\overline{Q})}{\sqrt{\frac{1}{n+i+1}\sum_{j=0}^{i+n}(Pj-\overline{P})^2} \times \sqrt{\frac{1}{n+i+1}\sum_{j=0}^{iївn}(Qj-\overline{Q})^2}} \quad (2)$$

Near the end of injection/hold pressure process, 'n' sampling cycles do not remain, so, from the sampling cycle (N−n), the sampling time preceding the last sampling cycle N by 'n' sampling cycles, the coefficient of correlation Ri is calculated by the following equation (3) using the data of the sampling cycle (i−n), the sampling cycle preceding the current sampling cycle 'i' by 'n' sampling cycles, up to the last sampling cycle N.

$$Ri = \frac{\frac{1}{N-i+n+1}\sum_{j=i-n}^{N}(Pj-\overline{P})(Qj-\overline{Q})}{\sqrt{\frac{1}{N-i+n+1}\sum_{j=i-n}^{N}(Pj-\overline{P})^2} \times \sqrt{\frac{1}{N-i+n+1}\sum_{j=i-n}^{N}(Qj-\overline{Q})^2}} \quad (3)$$

In the first embodiment, the CNC CPU 22 that initiated the processing for determining the time point at which the check ring closes sets the index 'i' indicating the current sampling cycle to '0', then reads and stores the data of the N sampling cycles in total, where 'N' is the last value of the index 'i' stored in the table T (Step b1). The CNC CPU 22 reads screw torques Q and resin pressures (injection pressures) P in the sampling cycle 0 up to the sampling cycle (n+i) indicated by the index 'i' (Step b2), calculates the coefficient of correlation Ri using the equation (2), and stores the calculated coefficient of correlation Ri, along with the data of the sampling cycle 'i', in the table T (Step b3).

Initially 'i' being '0', the coefficient of correlation Ri is calculated from (n+1) screw torques Q0 to Qn and (n+1) screw torques P0 to Pn of the sampling cycle 0 to the sampling cycle 'n'.

Next, the index 'i' is incremented by one (Step b4) and the value of index 'i' is compared with the preset value 'n' (Step b5). If the value of index 'i' does not exceed the preset value, control returns to Step b2 and the processing is repeated from Step b2 to Step b5 to calculate the coefficient of correlation Ri using the equation (2) and store the coefficient of correlation Ri along with the corresponding data.

If the value of index 'i' exceeds the preset value 'n', which means that there is data of 'n' sampling cycles preceding the sampling cycle indicated by the index 'i', the data (screw torques Q and resin pressures P) of the sampling cycle (i−n) up to the data of the sampling cycle (i+n) are read (Step b6), and the coefficient of correlation Ri is calculated by the equation (1) and stored, along with the data of the sampling cycle 'i', in the table T (Step b7). Next, the index 'i' is incremented by one (Step b8) and the value of the index 'i' is checked to see if it exceeds (N−n) (Step b9). If not, control returns to Step b6 and the processing is repeated from Step b6 to Step b9 to calculate the coefficient of correlation Ri using the equation (1) and store the coefficient of correlation Ri along with the corresponding data.

Subsequently, data of (2n+1) sampling cycles ranging from the sampling cycle (i−n) to the sampling cycle (i+n) is read and the coefficient of correlation Ri is calculated by the equation (1) and stored.

If the value of index 'i' exceeds (N−n) and the number of sampling cycles following the current sampling cycle indicated by the index 'i' becomes lower than the preset value 'n', the data (screw torques Q and resin pressures P) of sampling cycle (i−n) up to sampling cycle N is read (Step b10), the coefficient of correlation Ri is calculated by the equation (3), and stored along with the data of the sampling cycle 'i' in the table T (Step b11). Then, the index 'i' is incremented by one (Step b12), and the value of index 'i' is checked to see if it exceeds the total number N of sampling cycles (Step b13). If not, control returns to Step b10 and the processing is repeated from Step b10 to Step b13 to calculate the coefficient of correlation Ri using the equation (3) and store the coefficient of correlation Ri, along with the corresponding data.

If the value of index 'i' exceeds the total number N of sampling cycles, the coefficients of correlation Ri chronologically stored in the table T are compared sequentially beginning with the first one with the reference value. When a coefficient of correlation Ri lower than the reference value is detected in a sampling cycle, the data (screw torque Q, resin pressure P, screw position L, and the index 'i' indicating the sampling cycle) of that sampling cycle is stored as the management data for the current shot (injection molding cycle) in the management data table provided in the molding data storage RAM 23 (Step b16). In addition, the screw position Li in the sampling cycle 'i' in which the coefficient of correlation Ri becomes lower than the reference value and/or the elapsed time from the start of injection that is calculated by multiplying the sampling cycle index 'i' by the duration of one sampling cycle is displayed as the data of the time point at which the check ring closes in the display screen of the input device 30 (Step b17), to complete the processing for detecting the time point at which the check ring closes.

If all of the calculated coefficients of correlation Ri exceed the reference value, a signal indicating that the check ring did not close throughout the injection/hold pressure process is output to the display screen of the input device 30 (Step b15), to complete the processing for detecting the time point at which the check ring closes. The signal indicating that the check ring did not close is used as an alarm signal or as a signal indicating defective molding and a text message such as "Did not close" is displayed in the display screen of the input device 30.

Instead of providing processing in Step b14 to Step b17 as in the first embodiment to compare the coefficient of correlation with the reference value to detect the time point at which the check ring closes, the coefficients of correlation Ri chronologically stored in the table T for every sampling cycle 'i' may be displayed, together with the reference value, in the display screen of the input device 30 so that the sampling cycle in which the coefficient of correlation becomes lower than the reference value can be found and recognized as the time point at which the check ring closes. In this case, the coefficients of correlation and the reference value are displayed in the display screen as shown in FIGS. 2B, 3B, and 4B to enable the time point at which the check ring closes to be found.

If it is only required to determine the time point at which the check ring closes, it is not necessary to calculate the coefficient of correlation Ri for each sampling cycle as in the first embodiment described above. Instead, each time the coefficient of correlation Ri is calculated, the time point at which the check ring closes is checked. Once the coefficient of correlation Ri becomes lower than the reference value and the check ring is determined to be closed, the calculation of the coefficient of correlation Ri and the processing for determining the time point at which the check ring closes may be omitted.

Figure 9:
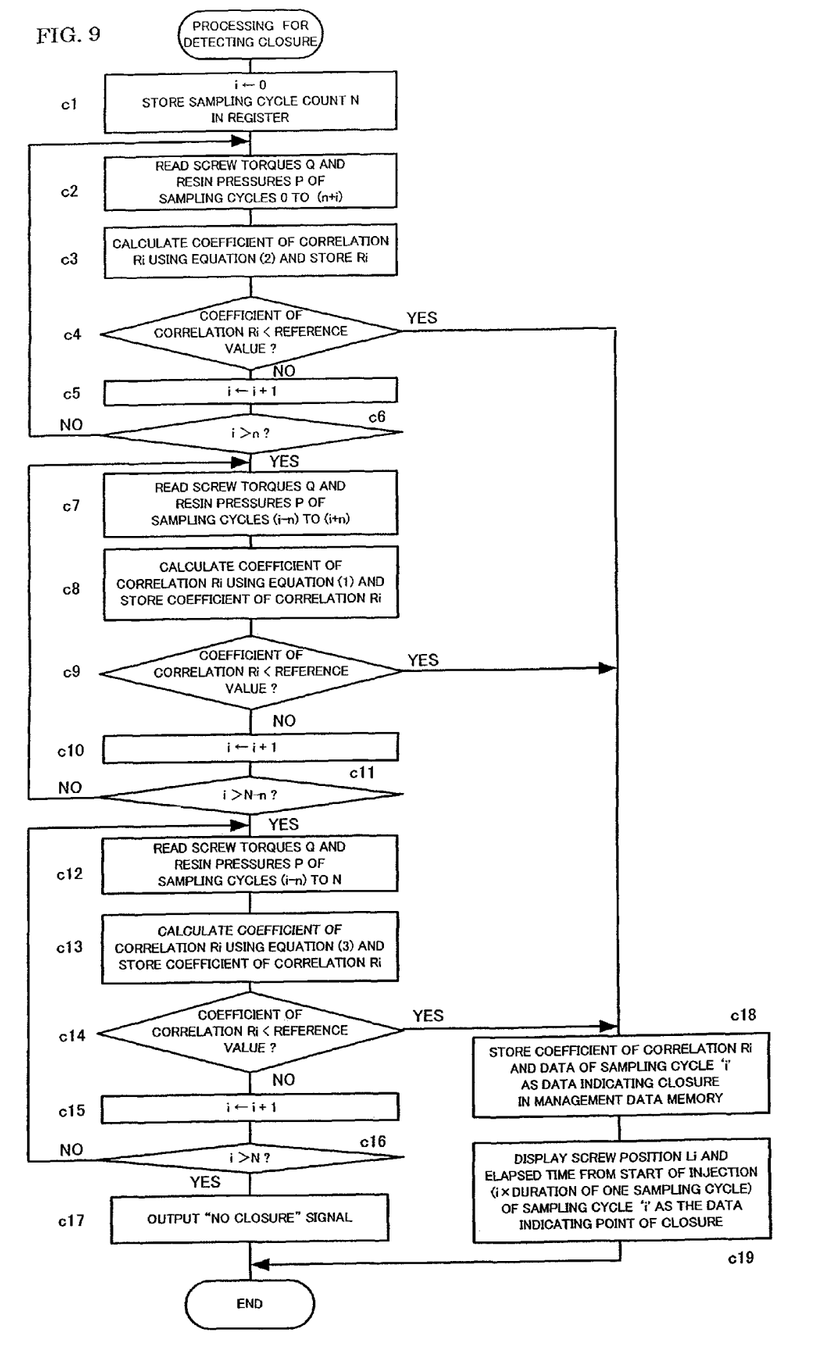
FIG. 9 is a flowchart showing an algorithm used to determine the time point at which the check ring closes in a second embodiment of the method for determining the time point at which the check ring closes according to the present invention.

FIG. 9 is a flowchart illustrating an algorithm executed to determine the time point at which the check ring closes in the second embodiment of the present invention, in which the processing for determining the time point at which the check ring closes is omitted in each sampling cycle after the time point at which the check ring closes is determined.

The second embodiment shown in FIG. 9 is similar to the first embodiment shown in FIG. 8, except for an additional step for comparing the coefficient of correlation Ri and the reference value immediately after the coefficient of correlation Ri is calculated.

The processing in Steps c1 to c3 and Steps c5 and c6 shown in FIG. 9 is the same as the processing in Steps b1 to b5 in FIG. 8; the processing in Steps c7, c8, c10, and c11 in FIG. 9 is the same as the processing in Steps b6 to b9 in FIG. 8; and the processing in Steps c12, c13, c15, and c16 in FIG. 9 is the same as the processing in Steps b10 to b13 in FIG. 8. The processing in FIG. 9 does not include processing in Step b14 in FIG. 8, and the processing in Steps c18 and c19 in FIG. 9 are substantially the same as the processing in Steps b16 and b17 in FIG. 8.

In the second embodiment, the index 'i' is set to '0', and 'N', sampling cycles in total, is stored (Step c1). Then, as in the first embodiment, the coefficient of correlation Ri is calculated by the equation (2), until the index 'i' exceeds the preset value 'n' (Steps c2 to c6), and the calculated coefficient of correlation Ri is compared with the reference value (Step c4). If the coefficient of correlation Ri is lower than the reference value, the check ring is determined to be closed and control proceeds to Step c18, where the data of the current sampling cycle 'i' (screw torque Qi, resin pressure Pi, screw position Li, and index 'i' indicating the current sampling cycle) is stored as the management data of the current shot (current injection molding cycle) in the management data table (Step c18). The screw position Li of the current sampling cycle 'i' and/or the elapsed time from the start of injection calculated by multiplying the index 'i' indicating the sampling cycle by the duration of one sampling cycle is displayed as the data indicating the time point at which the check ring closes in the display screen of the input device 30 (Step c19), to complete the processing for detecting the time point at which the check ring closes.

If the coefficient of correlation Ri is not lower than the reference value and the index 'i' exceeds the preset value 'n' in Step c4, data of (2n+1) sampling cycles from sampling cycle (i−n) to sampling cycle (i+n) is read, and the coefficient of correlation Ri is calculated by the equation (1) and stored (Steps c7 and c8). Then, the coefficient of correlation Ri is compared with the reference value (Step c9). If the coefficient of correlation Ri is lower than the reference value, control proceeds to Step c18 and, as described above, data of the current sampling cycle 'i' (screw torque Qi, resin pressure Pi, screw position Li, and index 'i' indicating the current sampling cycle) is stored in the management data table as the management data of the current shot (injection molding cycle). The screw position Li in the current sampling cycle 'i' and/or the elapsed time from the start of injection is displayed as the data indicating the time point at which the check ring closes (Steps c18 and c19), to complete the processing for detecting the time point at which the check ring closes.

If the coefficient of correlation Ri is not lower than the reference value and the index 'i' exceeds the value (N−n) in Step c9, the coefficient of correlation Ri is calculated by the equation (3) on the basis of the data (screw torques Q and resin pressures P) of the sampling cycle (i−n) up to sampling cycle N (Steps c12 and c13), and the coefficient of correlation Ri is compared with the reference value (Step c14). If the coefficient of correlation Ri is lower than the reference value, control proceeds to Step c18 and, as described above, the data of the current sampling cycle (screw torque Qi, resin pressure Pi, screw position Li, and index 'i' indicating the current sampling cycle) is stored in the management data table as the management data of the current shot (injection molding cycle). The screw position Li in the current sampling cycle 'i' and/or the elapsed time from the start of injection is displayed as the data indicating the time point at which the check ring closes (Steps c18 and c19), to complete the processing for detecting the time point at which the check ring closes.

The data stored in the management data table, including the screw torque Qi, resin pressure Pi, screw position Li, and the index 'i' indicating the time point at which the check ring closes, is used as the data for determining the quality of molded articles or as reference data for setting molding conditions. The data indicating the time point at which the check ring closes in each shot, including the screw torque Qi, resin pressure Pi, and screw position Li, is displayed in the display screen of the display device and used as information for monitoring the molding state.

If the coefficient of correlation Ri does not become lower than the reference value in Step c14 and the index 'i' exceeds the total number N of sampling cycles (Step c16), meaning that the check ring did not close during the injection/hold pressure process, a signal is output indicating that the check ring did not close (Step c17), to complete the processing for detecting the time point at which the check ring closes. This signal indicating that the check ring did not close is used as an alarm signal or a signal indicating defective molding, and a text message such as "Did not close" is given in the display screen of the input device 30.

In the above first and second embodiments, in Steps b17 and c19, the screw position Li or the elapsed time from the start of injection (=i×duration of one sampling cycle) is displayed as the data indicating the time point at which the check ring closes. If the coefficient of correlation R0 becomes lower than the reference value in the sampling cycle i=0, meaning that the check ring is already closed when injection starts, a text message such as "Closed before start" may be displayed. If the check ring closes during the forward movement of the screw, a text message such as "Closed during forward movement" may be displayed. If the check ring does not close during the forward movement of the screw, a text message such as "Did not close" may be displayed in Steps b15 and c17. Instead of the text messages such as "Closed before start", "Closed during forward movement", and "Did not close", symbols such as 'o', 'Δ', and 'x' may be displayed.

If the check ring did not close during the forward movement of the screw, a position (for example, −1 mm) to which the screw never reaches in its normal forward movement may be displayed as the screw position at which the check ring closes, or a very large number (for example, 999999 seconds) may be displayed as the elapsed time from the start of forward movement of the screw, in Steps b15 and c17.

Although the time point at which the check ring closes is detected in the injection/hold pressure process in the above embodiments, the present invention is also applicable in the forward movement of the screw for closing the check ring after the completion of metering and before the start of injection. For example, a technique for moving the screw to close the check ring between the completion of metering process and the start of injection is disclosed in Japanese Patent Application Laid-Opens No. 52-151352 and No. 53-39358, for example. The present invention is also applicable in the forward movement of the screw between the completion of metering process and the start of injection, as disclosed in the above technique.

The present invention is also applicable in both the forward movement process of the screw which takes place between the completion of metering and the start of injection and the injection/hold pressure process.

When the present invention is applied in the above both processes, that is, in the forward movement process and the injection/hold pressure process, the state of the check ring during the forward movement of the screw after the completion of metering and the state of the check ring in the injection/hold pressure process are as follows. It should be noted that the following list does not include the case in which the check ring is already closed when the screw starts moving forward after completion of metering, because the check ring is usually open when the screw starts moving forward after completion of metering.

Case 1: A check ring closes during the forward movement of the screw after completion of metering, and the check ring is already closed when the injection/hold pressure process starts.

Case 2: A check ring closes during the forward movement of the screw after completion of metering, and the check ring closes during the injection/hold pressure process.

Case 3: A check ring closes during the forward movement of the screw after completion of metering, and the check ring does not close during the injection/hold pressure process.

Case 4: A check ring does not close during the forward movement of the screw after completion of metering, and the check ring is already closed when injection/hold pressure process starts.

Case 5: A check ring does not close during the forward movement of the screw after completion of metering, and the check ring closes during the injection/hold pressure process.

Case 6: A check ring does not close during the forward movement of the screw after completion of metering, and the check ring does not close during the injection/hold pressure process.

The states of the check ring such as listed above provide useful information for setting molding conditions. For example, the above cases 2 and 3 indicate that the check ring closes during the forward movement of the screw after completion of metering, but the check ring is open when the injection/hold pressure process starts. This means that the closed check ring is reopened after the forward movement of the screw after completion of metering and before the injection/hold pressure process starts. For example, if a suck-back operation is performed after the forward movement of the screw after completion of metering, it is obvious that the suck-back operation conditions should be reviewed.

Although an electric servo motor is used as a rotational driving means for rotating the screw in the above embodiments, an electric or hydraulic motor may be used instead. In the above embodiments, an electric servo motor is used as the axial driving means for driving the screw in its axial direction and controlling injection and back pressure, but an electric motor or a hydraulic mechanism such as a hydraulic cylinder may be used instead.

It should be noted that when the screw is moved forward in the present invention, the screw rotation may be prevented or the screw may be rotated at a predetermined rotational speed. When the screw is rotated at a predetermined rotational speed, the screw may be rotated in either rotational direction.

To prevent screw rotation, the rotational driving means may be used to hold the rotational position of the screw. For example, when an electric servo motor is used, the rotational position can be held by placing the electric servo motor in a positioned state. When a hydraulic motor is used, the rotational position can be held by closing the oil path in the hydraulic motor. To prevent screw rotation, a brake or one-way clutch may be used.

In this embodiment, the rotational load applied to screw, or torque, is obtained by an observer provided in a servo motor control circuit for rotating the screw. That is, the observer is used as the torque detecting means for detecting the screw torque. The rotational load applied to the screw may be detected instead by a motor driving current. When a hydraulic motor is used, the screw torque may be detected from the hydraulic pressure. Alternatively, a strain sensor may be provided on the screw to detect the torque applied to the screw. When brake means is used to prevent screw rotation, the strain sensor is used to detect the screw rotation.

What is claimed is:

1. An injection molding machine having a screw equipped with a check ring, axial driving means for driving the screw in a axial direction of the screw, rotational driving means for rotating the screw, torque detecting means for detecting a torque applied to the screw, and resin pressure detecting means for detecting resin pressure, the injection molding machine comprising:
   correlation coefficient calculating means for calculating coefficients of correlation between the torques detected by the torque detecting means and the resin pressures detected by the resin pressure detecting means during forward movement of the screw; and
   check ring closure determining means for determining the time point at which the check ring closes when the calculated coefficients of correlation become lower than a reference value during the forward movement of the screw.

2. The injection molding machine according to claim 1, further comprising:
   screw position detecting means for detecting the position of the screw in the axial direction of the screw; and
   screw position storage means for storing the screw position detected by the screw position detecting means when the check ring closure determining means determines the time point at which the check ring closes.

3. The injection molding machine according to claim 1, further comprising:
   elapsed time calculating and storing means for calculating and storing the elapsed time from the start of forward movement of the screw until the check ring closure determining means determines the closure of the check ring.

4. The injection molding machine according to claim 1, wherein the check ring closure determining means further comprises signal output means for issuing a signal indicating that the check ring did not close during the forward movement of the screw when the check ring closure determining means determines that the calculated coefficient of correlation did not become lower than the reference value throughout the forward movement of the screw.

5. The injection molding machine according to claim 1, wherein the forward movement of the screw is a forward movement of the screw in an injection/hold pressure process.

6. The injection molding machine according to claim 1, wherein the forward movement of the screw is a forward movement of the screw after the completion of a metering process and before the start of an injection process.

7. The injection molding machine according to claim 1, wherein the torque detecting means detects a torque from a driving force of the rotational driving means.

8. The injection molding machine according to claim 1, wherein the torque detecting means detects a strain of the screw due to a torque applied to the screw.

* * * * *